United States Patent
Choi

(10) Patent No.: US 7,407,294 B2
(45) Date of Patent: Aug. 5, 2008

(54) MULTI-DIRECTION IMAGE VIEWING SYSTEM

(76) Inventor: Hae-Yong Choi, Mookdong I Park Apartment #108-301, 385 Mook-dong, Jungryang-gu, Seoul-city 131-768 (KR)

(*) Notice: Subject to any disclaimer, the term of this patent is extended or adjusted under 35 U.S.C. 154(b) by 66 days.

(21) Appl. No.: 11/181,917

(22) Filed: Jul. 15, 2005

(65) Prior Publication Data
US 2005/0248735 A1 Nov. 10, 2005

Related U.S. Application Data

(60) Provisional application No. 60/674,713, filed on Apr. 26, 2005.

(30) Foreign Application Priority Data

Jan. 6, 2004 (KR) .................. 10-2004-0004025

(51) Int. Cl.
G03B 21/26 (2006.01)
G03B 21/28 (2006.01)
G03B 21/56 (2006.01)
H04N 5/64 (2006.01)
G09G 5/00 (2006.01)
G09F 21/04 (2006.01)
G09F 15/00 (2006.01)

(52) U.S. Cl. .............................. 353/94; 353/13; 353/77; 353/79; 353/99; 353/119; 353/122; 348/787; 348/789; 348/840; 359/460; 345/1.3; 40/590; 40/606.01

(58) Field of Classification Search .................. 353/94, 353/37, 74, 77–79, 98, 99, 119, 122, 13; 348/739, 744, 787, 789, 794, 836, 843, 61, 348/840; 349/5, 7, 8; 359/214, 443, 453, 359/456, 460, 838, 850; 345/1.1, 1.2, 2.1, 345/3.1; 40/590, 606.01, 789, 411, 446, 40/593

See application file for complete search history.

(56) References Cited

U.S. PATENT DOCUMENTS

| 1,543,892 | A | * | 6/1925 | Willard ....................... 352/131 |
| 5,612,741 | A | * | 3/1997 | Loban et al. ................. 348/383 |
| 6,036,250 | A | * | 3/2000 | Glatter ......................... 296/21 |
| 6,367,934 | B1 | * | 4/2002 | Salesky et al. ................. 353/74 |
| 2002/0130967 | A1 | * | 9/2002 | Sweetser ..................... 348/383 |

FOREIGN PATENT DOCUMENTS

KR 20-0173278 9/1999

* cited by examiner

*Primary Examiner*—Rochelle-Ann Blackman
(74) *Attorney, Agent, or Firm*—Bacon & Thomas, PLLC

(57) ABSTRACT

A multi-direction image viewing system includes a triangular or rectangular image case, and plural projectors symmetrically installed to the inner sides of the image case in three or four directions. Projecting light paths cross each other so that the size of the image case is reduced to ⅙.₇ to ⅓ of the size of the conventional image case. By reducing the weight of the image case through size reduction, the multi-direction image viewing system can serve as a mobile multi-direction image viewing system coupled with a trailer and transported by a small sized vehicle such as a motorcycle, as a wide viewing angle multi-direction image system attached to a wall and coupled with the safety fence of the bus terminal or the subway station, and as an image viewing system mounted to a ceiling or wall.

3 Claims, 13 Drawing Sheets

MULTI-DIRECTION IMAGE VIEWING SYSTEM

This application claims the benefit of provisional application Ser. No. 60/674,713 filed Apr. 26, 2005 under 35 U.S.C. 119(e).

BACKGROUND OF THE INVENTION

1. Field of the Invention

The present invention relates to an image advertising system, and more particularly, to an image advertising system having minimal size and weight and a triangular structure capable of guaranteeing a sufficient viewing angle and a sufficient large screen, and to allow people to watch images in multi directions.

In detail, the present invention relates to an image viewing system, in which projection light paths of plural projectors cross one another, images are formed in a minimal sized image case in multiple directions, capable of being installed to a wall or a safety fence of a subway station, and capable of being engaged with a trailer to be conveniently moved.

2. Description of the Related Art

FIG. 9a is a view illustrating a conventional image viewing system including a screen 1e installed to a wall and a projector 2 for projecting an image upon the screen 1e or including a single flat-screen display such as a plasma display panel installed to a wall in the horizontal direction.

Generally, a viewing range within which a viewer 12 may effectively view an image, i.e. a horizontal length A of the screen 1e, as shown in FIG. 9, is about 30 degrees outward from the both vertical edges of the screen 1e, i.e. 60 degrees. A viewer must be within these 60 degrees to effectively view the entirety of the screen 1e. This fact is already known.

For reference, as shown in FIG. 1a, a horizontal length A to a vertical length B, e.g. the aspect ratio, is 16:9, i.e. A:B is 1.77:1. The ratio of in a movie theater is 2.35:1.

As shown in FIG. 2, when the image is projected by the projector 2, a projection ratio of the horizontal length A of the screen 1e to a projection distance C of a standard projection lens of the projector 2, i.e. an image projection ratio (hereinafter referred to as a projection ratio), is 1:1.3, as is also already known.

Although the projection ratio of the projection lens of the projector 2 from 1:0.8 to 1:3 can be applied to the present invention, the projection ratio of the projector 2, for the purpose of illustration, is assumed to be that of the projection ratio of a standard projection lens, 1:1.3.

This means that when the projection distance C is 1.3 m, the horizontal length of the screen is 1 m and the projection distance C is longer than the horizontal length A of the screen. In other words, it means that the projection distance C of the projector 2 is equal to the length of a side of an image case 3.

In the present invention, the size of the displayed image, i.e. the horizontal length A of the screen, ranges from 0.7 m to 3 m, preferably 1.5 m. For the purpose of illustration, hereinafter, a screen having a horizontal length A of 1.5 m is described.

When the horizontal length A of the screen is 1.5 m, the projection distance C must be 1.95 (m1.5 m×1.3) due to the projection ratio 1:1.3.

As shown in FIG. 2b, by setting the projection distance C (1.95 m) of right, left, front, and rear projectors 2a, 2b, 2c, and 2d to a reference, the projection distance C of the projector 2 becomes a factor to determine the sizes of front, rear, right, and left sides of a conventional rectangular image case 10. For example, the lengths C2 of the right and left sides of the conventional rectangular image case 10 become the sum of the projection distances of the front and rear projectors 2a and 2b, C+C, i.e. 1.95 m+1.95 m=3.9 m.

Thus, the size of the conventional rectangular image case 10 determined by the front, rear, right, and left sides thereof becomes C2×C2=3.9 m×3.9 m, and the horizontal length A, i.e. the size of the image, of the transparent screen 1 becomes 1.15 m. In other words, the screen size of the conventional rectangular image case 10 (1.15 m) is only 30% of the length (3.9 m) of a side of the conventional rectangular image case 10.

In other words, as shown in FIG. 2b, when a plurality of projectors 2 is installed, the length of a side of the conventional image case 10 is double that of the projection distance C, but the size of the transparent screen is not increased.

This phenomenon, as shown in FIG. 3, occurs in a triangular image case 3b.

Thus, according to the conventional image case, as shown in FIG. 4a, when a multi-direction image viewing system is installed to the ceiling, although the size of the conventional image case 10 is increased, the horizontal length A of the screen cannot be maximized. Moreover, as shown in FIG. 5a, when the conventional triangular image case 11 is installed in a passage, since the height C4 of the triangular is high, the size of the conventional triangular image case is also increased to obstruct pedestrian passage.

Moreover, as shown in FIGS. 6a and 7a, in an image viewing system engaged with a trailer 8, the width of the image case 3 having plural transparent screens 1 installed in four directions must not be over the average width (1.7 m) of a 1 ton truck.

However, since the length of a side of the conventional image case 3 having the screens with a horizontal length A, 1.5 m, installed in multiple directions is 3.9 m, as shown in FIG. 6a, the horizontal length A of the conventional image case 3 is over the width D (1.7 m) of a vehicle and is over the width (2.5 m to 3.5 m) of a lane of a general paved road. Thus, the conventional image case 3 cannot be transported through the road.

Although there is an image vehicle in which the image case is fixed to the rear side thereof, since the image case cannot be separated from the image vehicle, each image case requires a corresponding vehicle. Moreover, since the size of the image case is restricted according to the size of the transporting vehicle, screens cannot be installed in multiple directions, but only in a single direction.

As shown in FIG. 9b, in a conventional screen advertising system installed in a station of a subway, a train, or the like, the projector 2 is installed on the ceiling, and a scattering screen 1e is installed to a wall nearby the windows of trains, opposite to the platform.

According to the conventional screen advertising system in FIG. 9b, when the trains 91 enter the subway station, the trains 91 hide the scattering screen 1e, in the case that a safety fence 14 is installed in the subway station, since the safety fence 14 is disposed between the scattering screen 1e and the projector 2, consumers cannot view the scattering screen 1e.

Meanwhile, passengers stand in lines at the sides of doors 13a of the trains 91 and passengers in the trains 91 exit through the central area of the doors 13a.

Thus, as shown in FIG. 9c, when the scattering screen 1e is installed to the safety fence 14, effective view range of the scattering screen 1e, as shown in FIG. 1, is 30 degrees, respectively, at the right and left sides thereof, i.e. a total of 60 degrees. Thus, as shown in FIG. 9c, since the passengers at the sides of the doors 13a cannot view the entire scattering screen 1e, but only some passengers may view, advertising impact of the conventional screen advertising system is deteriorated.

In addition, as shown in FIG. 9a, in order to increase the advertising impact of the image advertising system, the image advertising system, installed in passages such as passages in a shopping mall through which consumers walk, must have a viewing range greater than 120 degrees. However, the conventional image advertising system has a viewing range of only 60 degrees, i.e., the sum of the right and left ranges. Thus, it is an object of the present invention to increase the viewing angle.

As shown in FIGS. 3 and 16a, when the projectors 2 are disposed at the inner intermediate portion of the conventional triangular image case 11 and the transparent screens 1 are installed at the sides of the conventional triangular image case 11, since the size of the conventional image advertising system is double that of the projection distance C of the projectors and the weight is increased due to the increased size, the conventional triangular image case installed to the wall of the passage serves as a factor to disturb consumers' passing.

Thus, in the multi-direction image system using the projectors 2, there are important technical problems such that a screen having a maximal horizontal length A is implemented in an image case 3 having a minimal space, to the contrary, the same size screen is implemented in the minimal sized image case 3, and/or images are displayed in two directions, i.e. in the right and left directions of the image case 3, in three directions, i.e. in the right, left, and central directions of the image case 3, or in multiple directions, i.e. in the front, rear, right, and left direction of the image case 3.

SUMMARY OF THE INVENTION

Therefore, the present invention has been made in view of the above and/or other problems, and it is an object of the present invention to provide a multi-direction image viewing system in which a plurality of projectors 2 is installed in a rectangular image case 3a in FIG. 10c, or a triangular image case 3b in FIG. 11d, images are displayed on left, right, and oblique sides of the triangular image case 3b such that a viewing angle of 120 degrees is increased over 240 degrees, or the images are displayed on three sides of the triangular image case 3b to form a 360 degree viewing angle, images having a viewing angle of 90 degrees are displayed on four sides of the rectangular image case 3a to form a 360 degree viewing angle, the conventional 30% maximal horizontal length of a screen with respect to the side length of the image case 3 is increased from 60% to over 100%, i.e. two fold, a plurality of projectors 2 is installed to form projecting light paths that cross each other such that the increased projection distances C of the projectors 2 are reduced to minimize the size of the image case 3, so that the multi-direction image viewing system is convenient to install to the passages of a shopping mall, to a wall of a display window, or to a safety fence 14 of a subway station, and the image case 3 is capable of being engaged with a trailer 8 to be transported by motorcycle, bicycle, vehicle, or the like, and is capable of displaying images during transportation.

In accordance with the present invention, the above and other aspects can be accomplished by the provision of a multi-direction image viewing system for displaying an image including an image case, transparent screens respectively installed to sides of the image case, projectors installed below the respective transparent screens, and reflecting mirrors installed to sides of the image case respectively opposite to the projectors, wherein projecting light paths of the respective projectors are symmetrically formed in multiple directions such as in two directions of the right and left directions, in three directions of the right, left, and center directions, in the four directions of the right, left, front, and rear directions, or the like and crossed to each other.

Preferably, the projecting light paths are formed by the projectors and the transparent screens.

The image case includes a triangular image case, the transparent screens are installed to the right, left, and center sides of the triangular image case, and the projecting light paths are symmetrically formed to cross each other in the right and left directions, or in the three directions of the right, left, and center directions.

The multi-direction image viewing system further includes a trailer with which the lower side of the image case is coupled such that the multi-direction image viewing system is transported by a vehicle.

Preferably, the triangular image case is coupled with a safety fence of a subway station.

The transparent screens are installed to the right and left sides of the image case and the projecting light paths are symmetrically formed in the image case such that the image case is attached to a wall or a display window.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
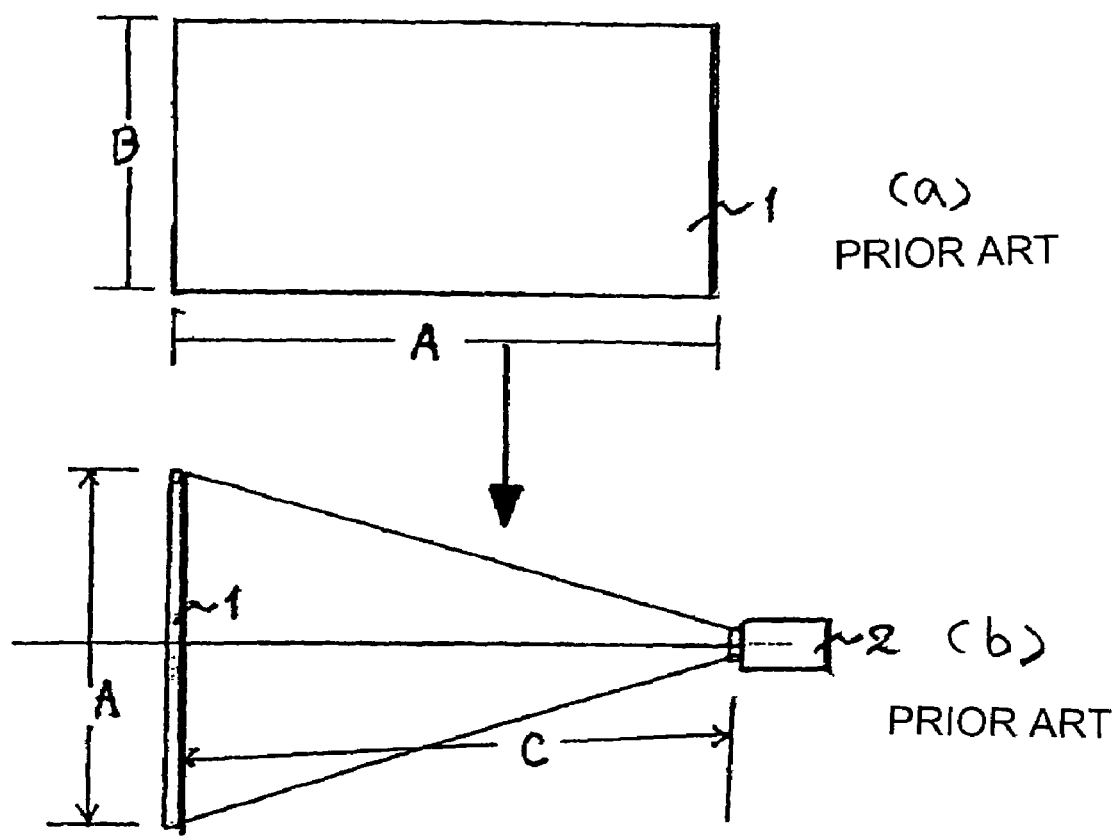
FIG. 1a is a view illustrating a horizontal side to vertical side ratio of a screen.
FIG. 1b is a view illustrating a ratio of a projection distance of a projector to the horizontal side of the screen.
Figure 2:
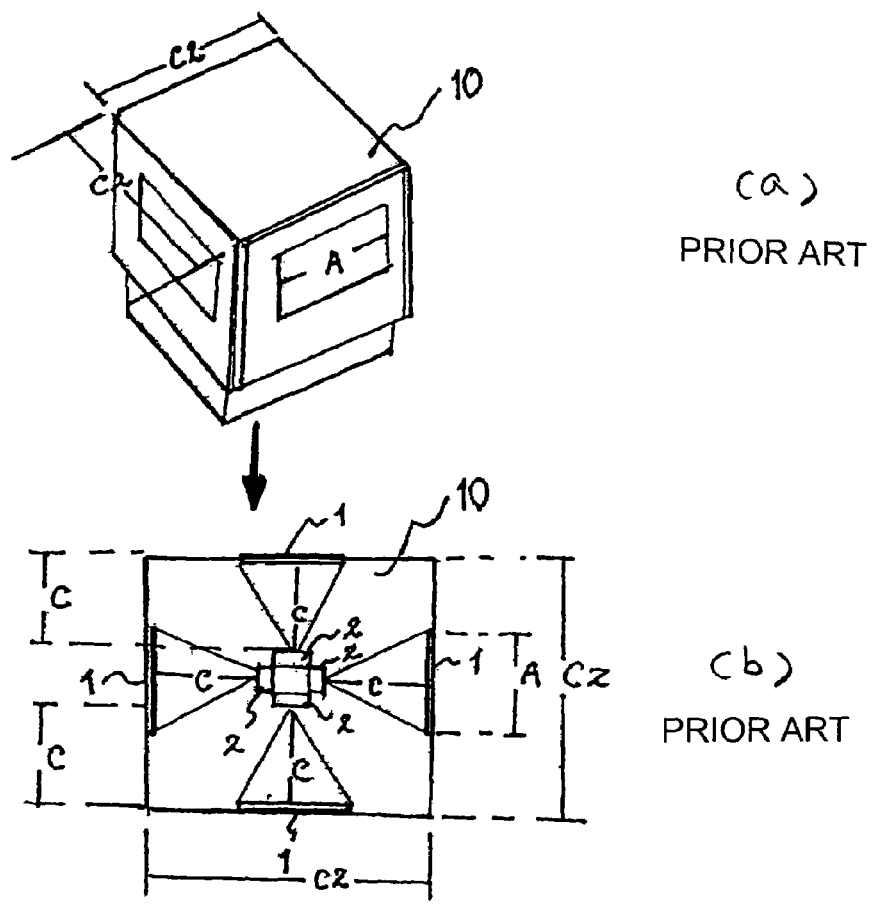
FIG. 2a is a perspective view illustrating a conventional rectangular image case.
FIG. 2b is a plane view illustrating the inner structure of the conventional rectangular image case.

Hereinafter, the preferred embodiments of a multi-direction image viewing system according to the present invention will be described in detail with reference to the accompanying drawings.

The multi-direction image viewing system according to the preferred embodiment of the present invention includes transparent screens 1 installed to sides of an image case 3 such as a triangular image case 3a or a rectangular image case 3b, and a plurality of projectors 2. Since a plurality of projecting light paths of the projectors 2 are bent and symmetrically formed in the image case 3, the projected image, i.e. a ratio of the projecting distance C of the projector 2 to a horizontal length A of the screen as a projection ratio 1:1.3 is within the ranges of from 1:1 to 1:0.25.

Embodiment 1

Figure 10:
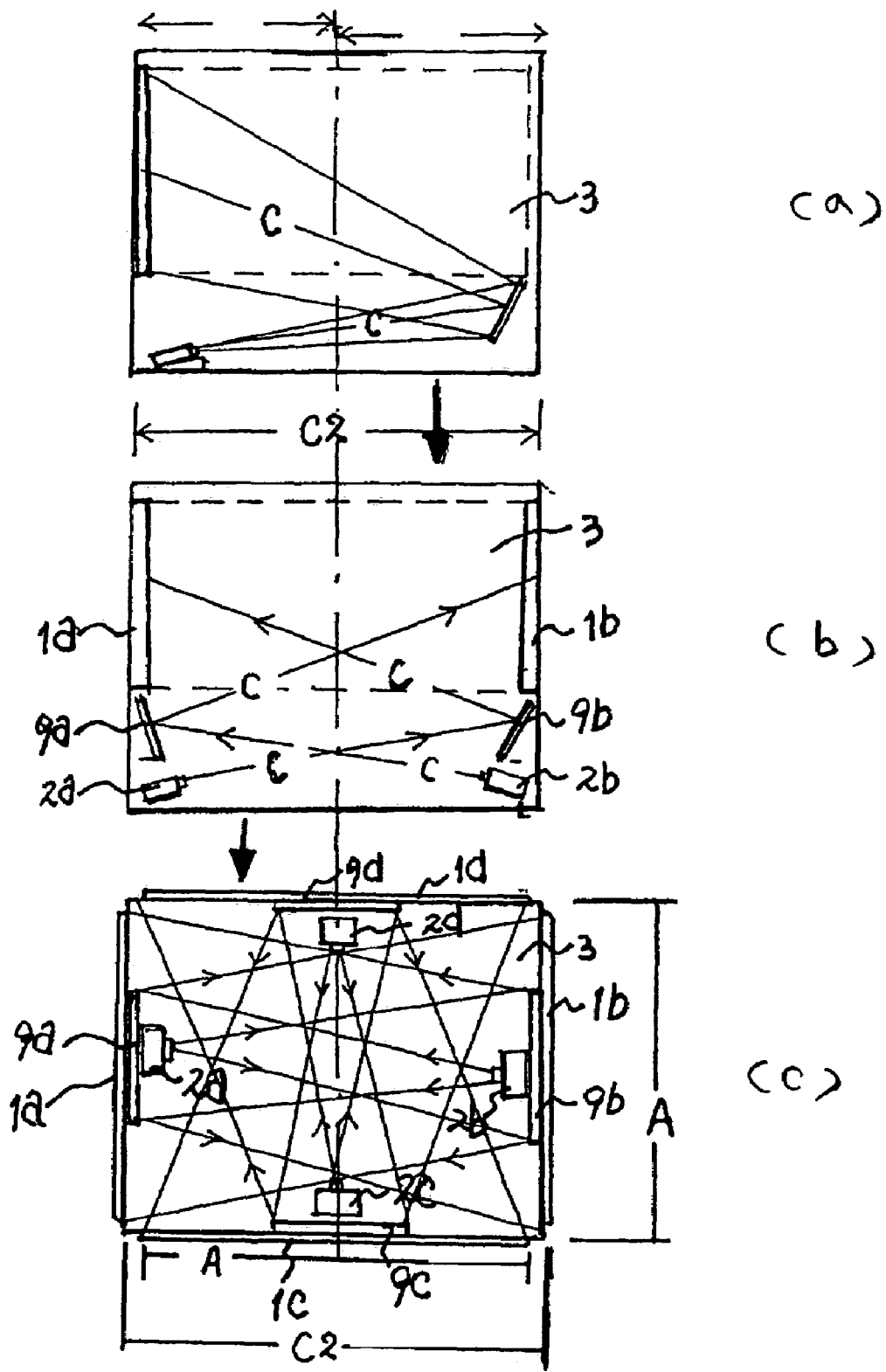
FIG. 10a is a view illustrating a projecting light path of the multi-direction image viewing system according to the preferred embodiment of the present invention, formed in a single direction.
FIG. 10b is a view illustrating projecting light paths of the multi-direction image viewing system according to the preferred embodiment of the present invention, symmetrically formed in two directions.
FIG. 10c is a view illustrating projecting light paths of the multi-direction image viewing system according to the preferred embodiment of the present invention, formed in the front, rear, right, and left directions.
Figure 11:
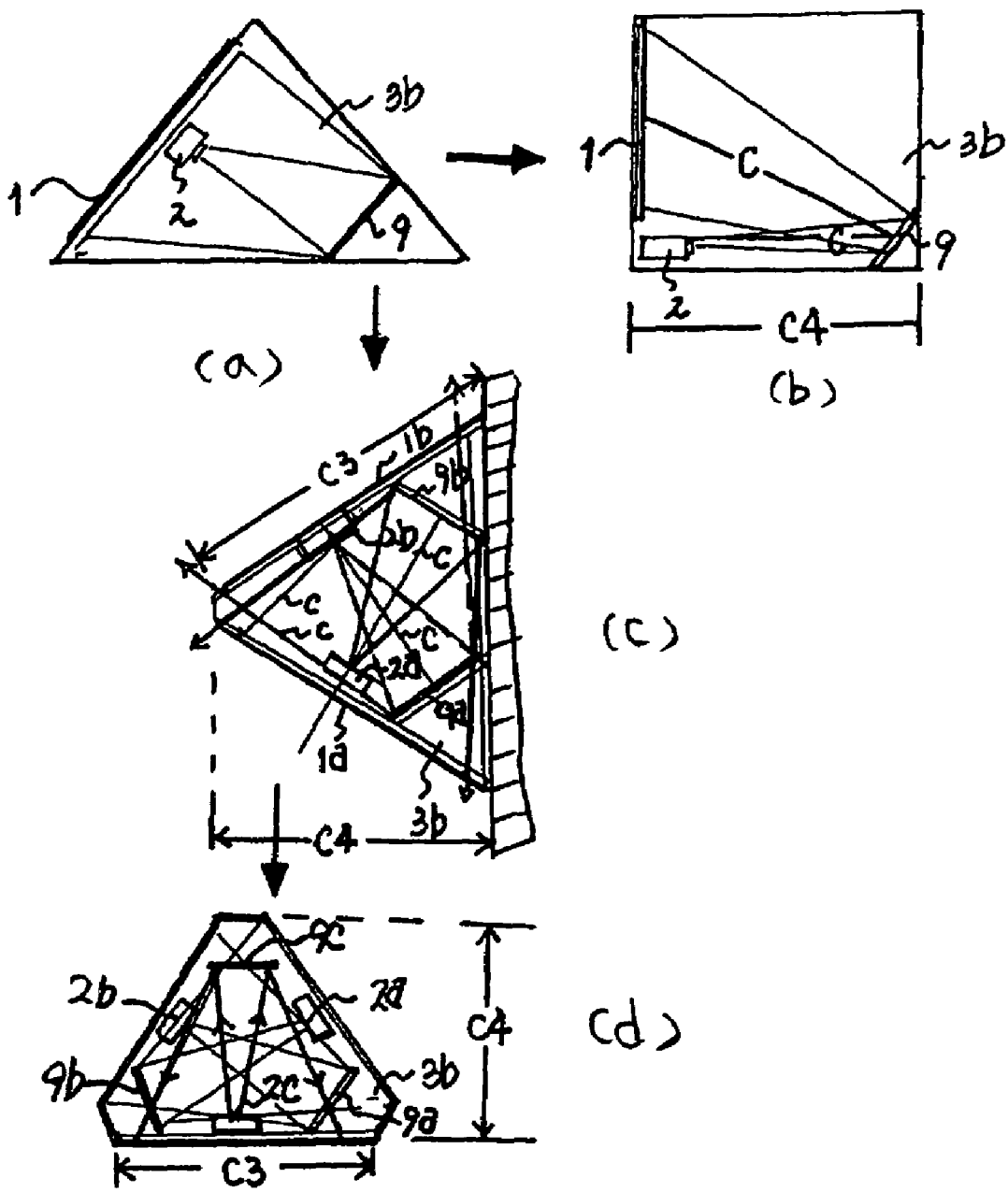
FIG. 11a is a plane view illustrating a general projecting light path formed in the triangular image case.
FIG. 11b is a side view illustrating the general projecting light path formed in the triangular image case.
FIG. 11c is a view illustrating symmetric projecting light paths formed in the triangular image case.
FIG. 11d is a view illustrating projecting paths formed by three sides of the triangular image case.

As shown in FIGS. 10a and 11a, a projector 2a is installed in the lower side of the image case 3 such as the rectangular image case 3a or the triangular image case 3b, a reflecting mirror 9 is installed at a place where an angle is formed with respect to the projector 2a in the image case 3, and a transparent screen 1 is installed to a place of the image case 3 above the projector 2a so as to form a projecting light path in which a projecting light emitted from the projector 2a is reflected by the reflecting mirror 9 and reaches the transparent screen 1.

When the projecting light paths like the projecting light path in FIG. 10a, as shown in FIG. 10b, are formed in the direction opposite to the projecting light path in FIG. 10a, i.e. are symmetrically formed, an image projected by a left projector 2a is reflected by a right reflecting mirror 9b and projected to a left transparent screen 1a in a left projecting light path, and an image projected by a right projector 2b is reflected by a left reflecting mirror 9a and projected to a right transparent screen 1b in a right projecting light path.

As shown in FIG. 10b, when the projecting light paths, in which the projecting lights of the right and left projectors 2a and 2b are reflected by the reflecting mirrors 9 spaced apart from the projectors 2a and 2b by a distance as long as the horizontal length of the image case 3 and are projected to the transparent screens 1a and 1b, are symmetrically formed to cross each other, although the horizontal length C2 of the image case 3 is 1.5 m, the projecting distance C of the projector 2a becomes a projecting distance C corresponding to the distance of the projecting light path, i.e. sum of the distance 1.5 m from the projector 2 to the reflecting mirror 9 and the distance 0.1.5 m from the reflecting mirror 9 to the transparent screen 1. In this case, since, when the projection ratio is 1:1.3, the projecting distance is 3 m, the horizontal length A of the transparent screen 1 can be enlarged to 2.3 m. Thus, a screen having a horizontal length A of 1.5 m is sufficiently obtained.

In other words, although a general ratio (projection ratio) of the projection distance C to the horizontal length A of the screen is 1:1.3, in the projecting light path of the multi-direction image viewing system according to the first preferred embodiment of the present invention, a projection ratio of 1:0.66 can be obtained.

As a result, the size of the image case 3 required to implement the same size screen as the conventional size screen can be reduced to about ¼ size of the conventional image case, or a double sized screen can be implemented in a conventional-size image case.

Embodiment 2

As shown in FIG. 10c, according to the same principle of the first preferred embodiment, projecting light paths are formed in the front, rear, right, and left directions, i.e. are symmetrically formed about the vertical axis and the horizontal axis so that images can be displayed in the front, rear, right, and left directions, i.e. in multiple directions.

In other words, a left reflecting mirror 9a and a left transparent screen 1a are installed above a left projector 2a, a right reflecting mirror 9b and a right transparent screen 1b are installed above a right projector 2b, a front reflecting mirror 9c and a front transparent screen 1c are installed above a front projector 2c, and a rear reflecting mirror 9d and a rear transparent screen 1d are installed above a rear projector 2d so that respective projecting light paths are formed.

The projecting light paths in the multi-direction image viewing system according to the second preferred embodiment of the present invention, as shown in FIG. 10c, are formed by symmetrically crossing the projecting light paths in FIG. 10b about the vertical axis and the horizontal axis. Since the four projecting light paths identical to the projecting light paths of the multi-direction image viewing system according to the first preferred embodiment of the present invention are formed in the front, rear, right, and left directions, the size of the multi-direction image viewing system according to the second preferred embodiment of the present invention is reduced to ¼ (25%) size of the conventional multi-direction image viewing system as shown in FIG. 15a. A detailed description of this configuration will be provided later.

In this preferred embodiment, when considering the installation space of the projectors 2, the size of the multi-direction image viewing system can be reduced to ⅓ of the conventional multi-direction image viewing system and the size of the screen of the multi-direction image viewing system is twice that of the screen of the conventional multi-direction image viewing system.

Embodiment 3

As shown in FIGS. 11a and 11b, a projector 2 is installed to an intermediate portion of an inner side of a triangular image case 3b and a reflecting mirror 9 is installed near a corner opposite to the projector 2 to form a folded projecting light path as shown in FIG. 11b.

As shown in FIG. 11c, projecting light paths are symmetrically formed by the projectors 2 in FIGS. 11a and 11b, the transparent screens 1, and the reflecting mirrors 9.

In other words, a left projector 2a is installed to an intermediate portion of a left side of the triangular image case 3b, a right projector 2b is installed to an intermediate portion of a right side of the triangular image case 3b, a left reflecting mirror 9a is installed near a corner opposite to the left projector 2a, and a right reflecting mirror 9b is installed near a corner opposite to the right projector 2b.

As shown in FIG. 11a, since the light, projected from the lower projector 2 below the transparent screen 1 in the triangular image case 3b, is reflected by the reflecting mirror 9 and is formed on the transparent screen 1, the projection distance C in the triangular image case 3b, as shown in FIG. 11b, becomes C+C, i.e. twice the projection distance in the conventional image case 11 in FIG. 16a.

As such, when the projecting light paths like the projecting light path in FIG. 11a are crossed about the vertical axis as shown in FIG. 11c, the images can be formed on the right and left sides of the triangular image case 3b having the same space.

Thus, in this case, the projection distance C of the projector 2 becomes three times that of the conventional image case 3a having the same space or the size of the conventional image case 3b can be reduced to ⅓.

Embodiment 4

As shown in FIG. 11d, left, right, and center projectors 2a, 2b, and 2c are respectively installed to intermediate portions of the left, right, and center sides of the triangular image case 3b, and left, right, and center reflecting mirror 9a, 9b, and 9c are respectively installed near corners opposite to the left, right, and center sides of the image case 3b.

In other words, as shown in FIG. 11d, a center transparent screen 1c is installed at the center side of the triangular image case 3b, a center reflecting mirror 9c is installed near a corner of the triangular image case 3b opposite to the center side of the triangular image case 3b, and the center projector 2c is installed below the center transparent screen 1c to form a center projecting light path. A left projecting light path is formed such that a left transparent screen 1a is installed at the left side of the triangular image case 3b, a right reflecting mirror 9a is installed near a corner of the triangular image case 3b opposite to the left side of the triangular image case 3b, and the left projector 2b is installed below the left transparent screen 1a. In addition, a right projecting light path is formed such that a right transparent screen 1b is installed at the right side of the triangular image case 3b, a left reflecting mirror 9b is installed near a corner of the triangular image case 3b opposite to the right side of the triangular image case 3b, and the right projector 2a is installed below the right transparent screen 1b.

The projecting light paths, like the projecting light path in FIGS. 11a and 11b, are formed in the three directions as shown in FIG. 11c so that images can be displayed on the three sides of the image case. Moreover, in this case, since the projection distances C of the three projectors 2 are reduced by the reflecting mirrors 9 in the triangular image case 3b and the right, left, and center projecting light paths cross each other, the size of the triangular image case 3b is reduced to ⅓ of the size of the conventional image case or less.

Embodiment 5

Figure 12:
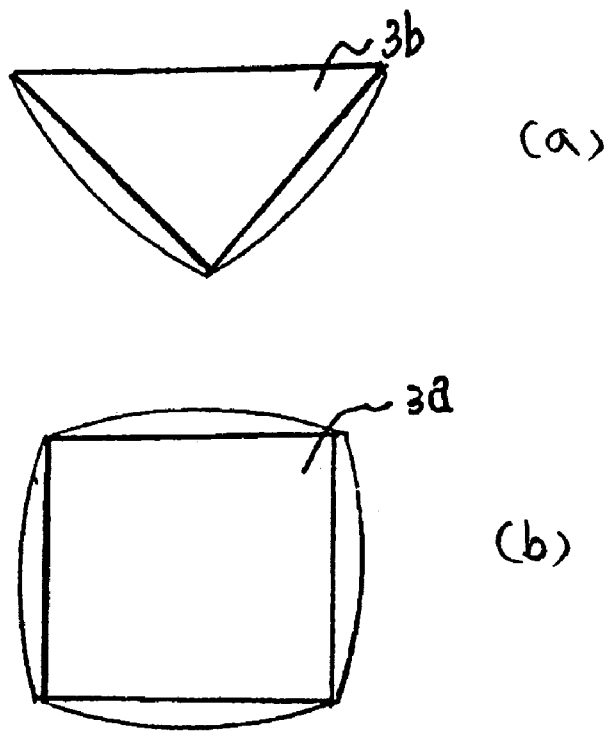
FIG. 12a is a view illustrating a triangular arc-shaped image case.
FIG. 12b is a view illustrating a rectangular arc-shaped image case.

As shown in FIG. 12a, the left and right transparent screens 1a and 1b have an arc shape so that the sizes of the left and right transparent screens 1a and 1b are maximized to form a single semi-circular screen.

In other words, as shown in FIG. 12b, according to the same principle of the first preferred embodiment, front, rear, left, and right transparent screens 1a, 1b, 1c, and 1d have an arc shape to maximize the size of the respective transparent screens 1a, 1b, 1c, and 1d and the respective transparent screens 1a, 1b, 1c, and 1d are connected to each other so that a single circular screen on which images are displayed can be implemented.

As shown in FIGS. 12a and 12b, when the transparent screen 1 has an arc shape, the projection distance is enlarged to the maximum extent possible, and 120 degree images of screens are combined, a single, circular, 360 degree image or a 240 degree image can be displayed.

Figure 13:
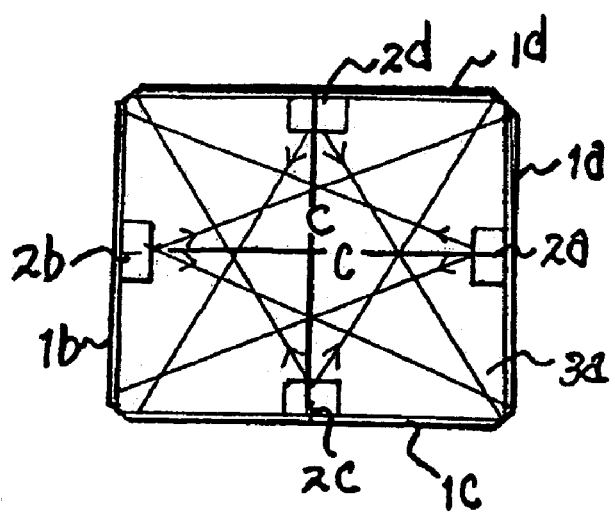
FIG. 13 is a view illustrating a projecting light path formed in the rectangular image case.

In the same manner, the structures in FIGS. 10c and 13 are modified into the structure having a curved transparent screen and a 90 degree projection range of the image projected on the curved screen so that a circular image of 360 degrees can be displayed in ⅓ the space of the conventional multi-direction image viewing system.

Embodiment 6

As shown in FIG. 13, the front, rear, left, and right projectors 2c, 2b, 2a, 2d are installed to inner front, rear, left, and right sides of the rectangular image case 3a, i.e. below the front, rear, left, and right transparent screens 1c, 1d, 1a, and 1b, respectively, so that the front, rear, left, and right projecting light paths are formed.

As shown in FIG. 13, in the same way, when all the projecting light paths of the projectors 2 are crossed in the rectangular image case 3a, the size of the rectangular image case 3a is reduced to ½ or less than the size of the conventional rectangular image case.

Embodiment 7

As shown in FIG. 14a, the projectors 2a, 2b, and 2e are installed to three corners of the triangular image case 3b, respectively, the left, right, and center transparent screens 1a, 1b, and 1e are installed to the sides opposite to the three corners to form three projecting light paths in three directions.

Moreover, a multi-direction image viewing system attachable to a wall can be implemented by removing the center projector 2e and the center transparent screen 1e to form only the left and right projecting light paths.

As shown in FIG. 14a, when the projectors 2a, 2b, and 2e are installed to three corners of the triangular image case 3b, respectively, the left, right, and the respective projecting light paths of the projectors 2 are crossed to each other, the size of the triangular image case 3b is reduced to ½ of the size of the conventional triangular image case.

As shown in FIGS. 14b an 8, when the center projector 2e and the center transparent screen 1e are removed and the center side of the triangular image case is fixed to a wall to install the transparent screens to the left and right sides of the triangular image case, a 180 degree viewing angle can be obtained. This multi-direction image viewing system structured as described above, as shown in FIG. 8, effectively serves as a wall mounted advertising system.

Embodiment 8

The transparent screens 1 are installed to the front, rear, left, and right sides of the image case 3 like the image case in FIGS. 7a, 7b, and 7c, an elevator 7 is installed in an intermediate box 6 installed to the lower side of the image case 3, and a trailer 8 is installed to the lower side of the elevator 7, or as shown in FIGS. 7b and 7c, the elevator 7 and the trailer 8 are installed to the lower side of the intermediate box 6 in FIG. 7a.

Embodiment 9

Figure 9:
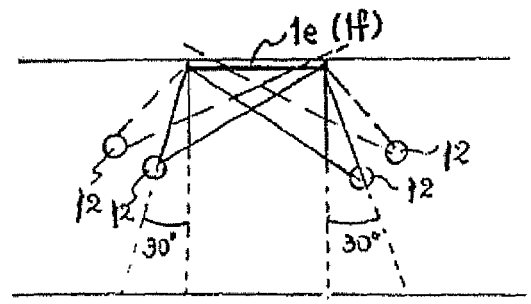
FIG. 9a is a view illustrating a viewing angle of a flat screen.
FIG. 9b is a view illustrating a viewing angle of a flat screen of the conventional image viewing system installed in a subway station.
FIG. 9c is a view illustrating the viewing angle of a flat screen installed in the subway station.
FIG. 9d is a perspective view illustrating the multi-direction image viewing system according to the preferred embodiment of the present invention installed to a safety fence of a subway station.
FIG. 9e is a view illustrating a horizontal viewing angle of the multi-direction image viewing system according to the preferred embodiment of the present invention.
FIG. 9f is a view illustrating the viewing angle of the multi-direction image viewing system according to the preferred embodiment of the present invention installed to a safety fence of a subway station.
Figure 9:
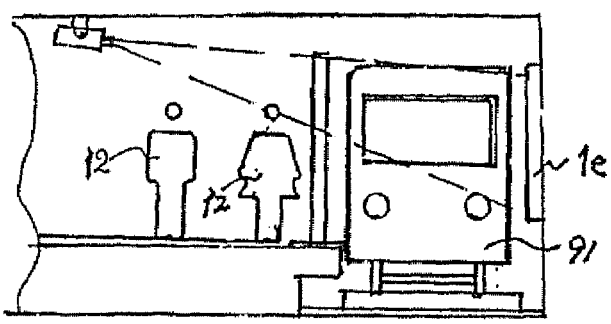
Figure 9:
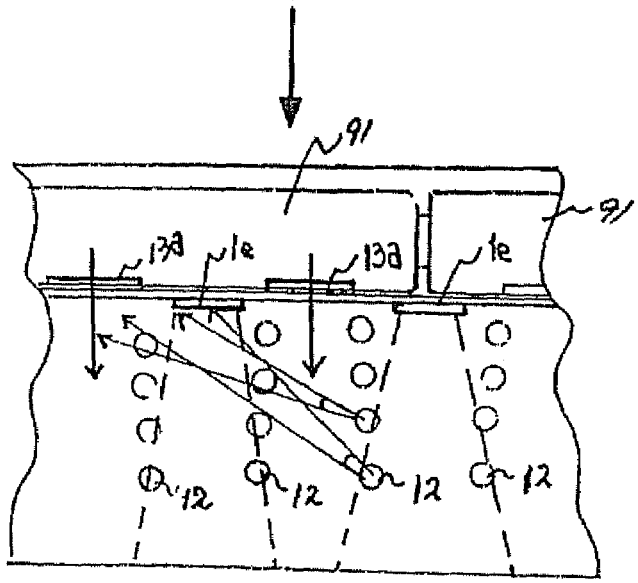
Figure 9:
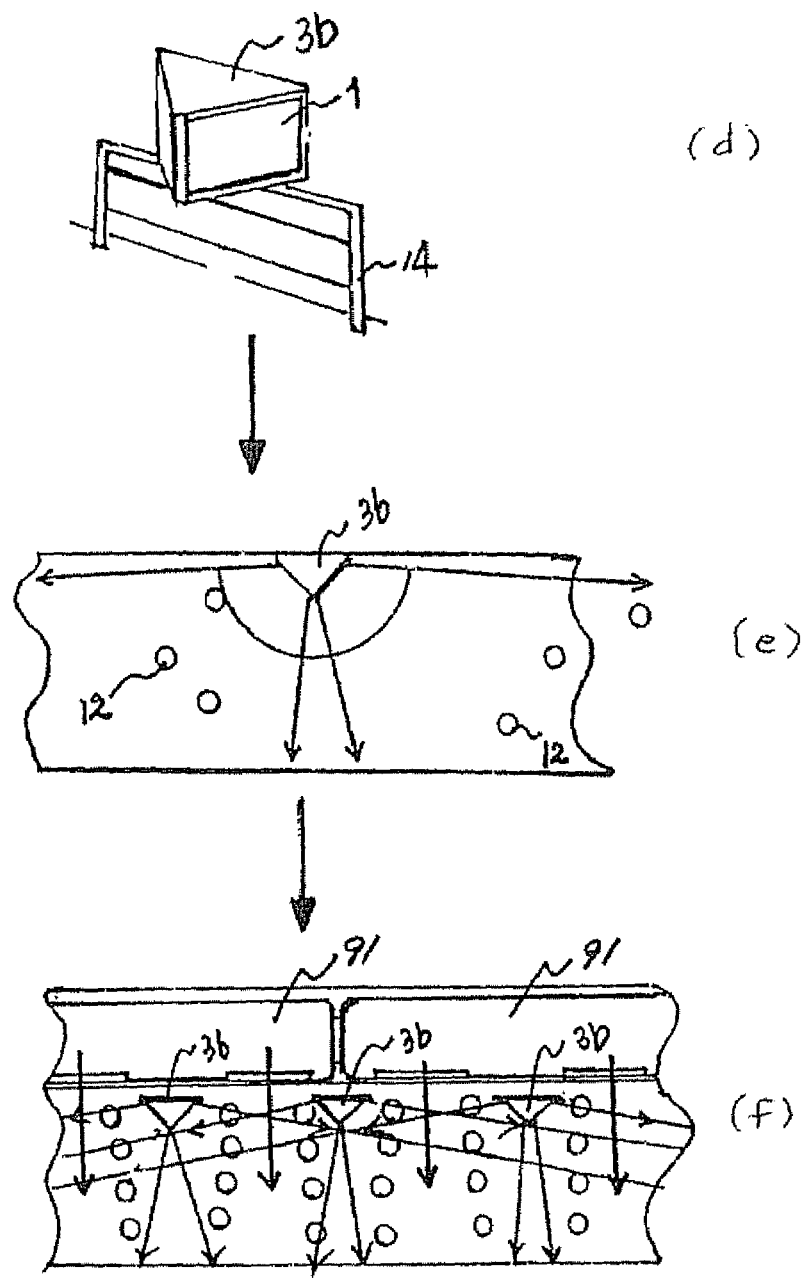

As shown in FIGS. 9d and 9f, the transparent screens 1 are installed to the inner left and right sides or the left, right, and center sides of the triangular image case 3b. The triangular image case 3b, as shown in FIG. 9d, may be installed to the safety fence 14, a screen door fence, or the like, used in a railroad station, the subway, or the like to allow consumers to view advertisements.

In other words, since, according to the triangular image cases 3b in FIGS. 11c and 11d, the horizontal length A of the screens can be enlarged to the same size as the horizontal length A of the triangular image case in the ¼ or less space of the conventional triangular image case, a maximal sized screen can be implemented in a minimal sized image case and its weight is remarkably reduced.

Thus, according to the multi-direction image viewing system according to this preferred embodiment of the present invention, when the triangular image case 3b is installed to the safety fence 14 in the electric railroad station, as shown in FIG. 9f, or to the upper side of the screen safety fence 14, as shown in FIG. 9d, a 180 degree viewing angle in the horizontal direction can be obtained by the transparent screens installed to the left and right sides of the triangular image case 3b as shown in FIG. 9e. In addition, when the center transparent screen 1 is installed to the center side of the triangular image case, consumers at the platform, opposite to the place where the multi-direction image viewing system is installed, can view the image. Moreover, in the multi-direction image viewing system according to this preferred embodiment of the present invention, when the transparent screens are installed to the left and right sides of the triangular image case, as shown in FIG. 8, the multi-direction image viewing system may serve as a wall mounted image viewing system.

Embodiment 10

Figure 17:
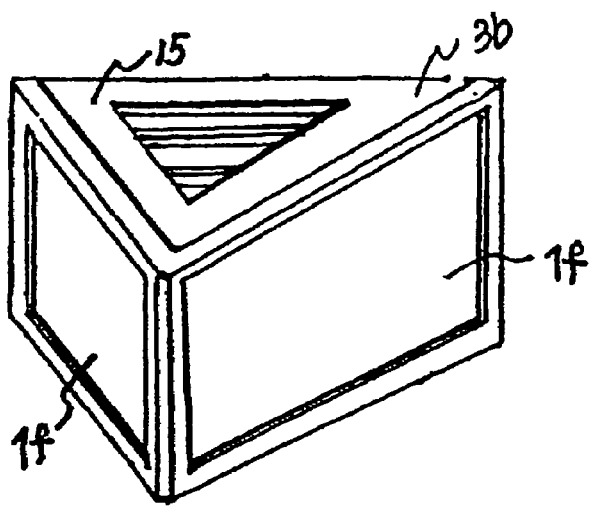
FIG. 17 is a perspective view illustrating the triangular image case in which flat-screens such as a plasma display panel are installed to right and left sides of the triangular image case.

In the multi-direction image viewing system suitable to a relatively small sized screen such as a 40 inch screen or 60 inch screen, as shown in FIG. 17, flat-screen display panels such as a plasma display panel, a liquid crystal display, or the like are installed to the left and right sides of the triangular image case 3b, respectively.

Figure 8:
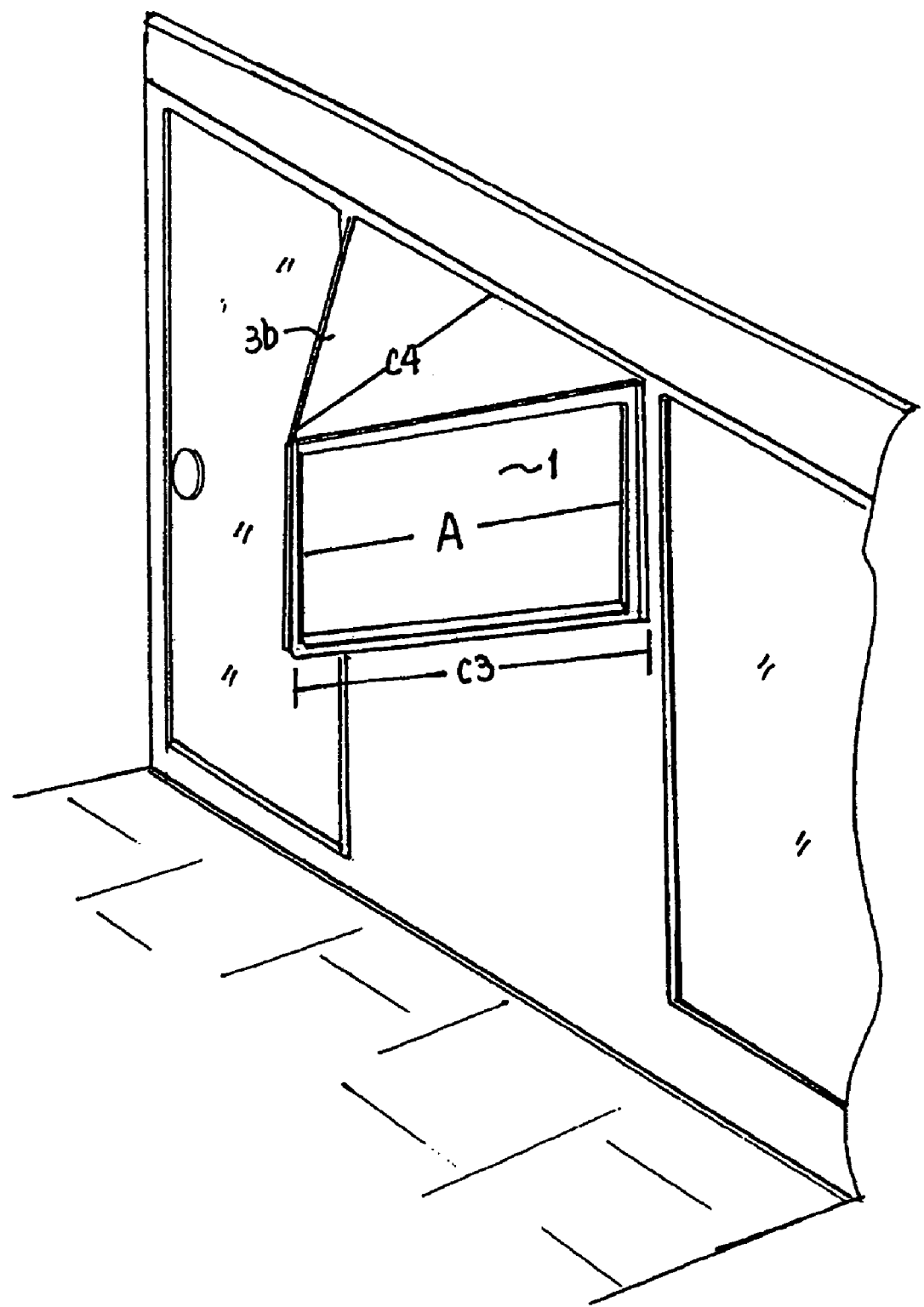
FIG. 8 is a perspective view illustrating the multi-direction image viewing system according to the preferred embodiment of the present invention installed to a wall.

The multi-direction image viewing system, as shown in FIG. 8, may be attached to a wall of the road, the screen fence 14 of the station of the railroad, the subway, or the like, or as shown in FIG. 9d, to the safety fence 14 of the subway station. In other words, as shown in FIG. 17, the triangular image case 3b includes a triangular frame 15 in which flat-screen panels 16 are installed to the left and right sides, and the flat-screen panels 16 installed to the left and right sides of the triangular frame 15.

Hereinafter, operation and effect of the multi-direction image system according to the preferred embodiments of the present invention will be described as follows.

The operation and effect of the rectangular image case 3a will be described in detail with reference to FIGS. 15a, 15b, and 10c.

Figure 15:
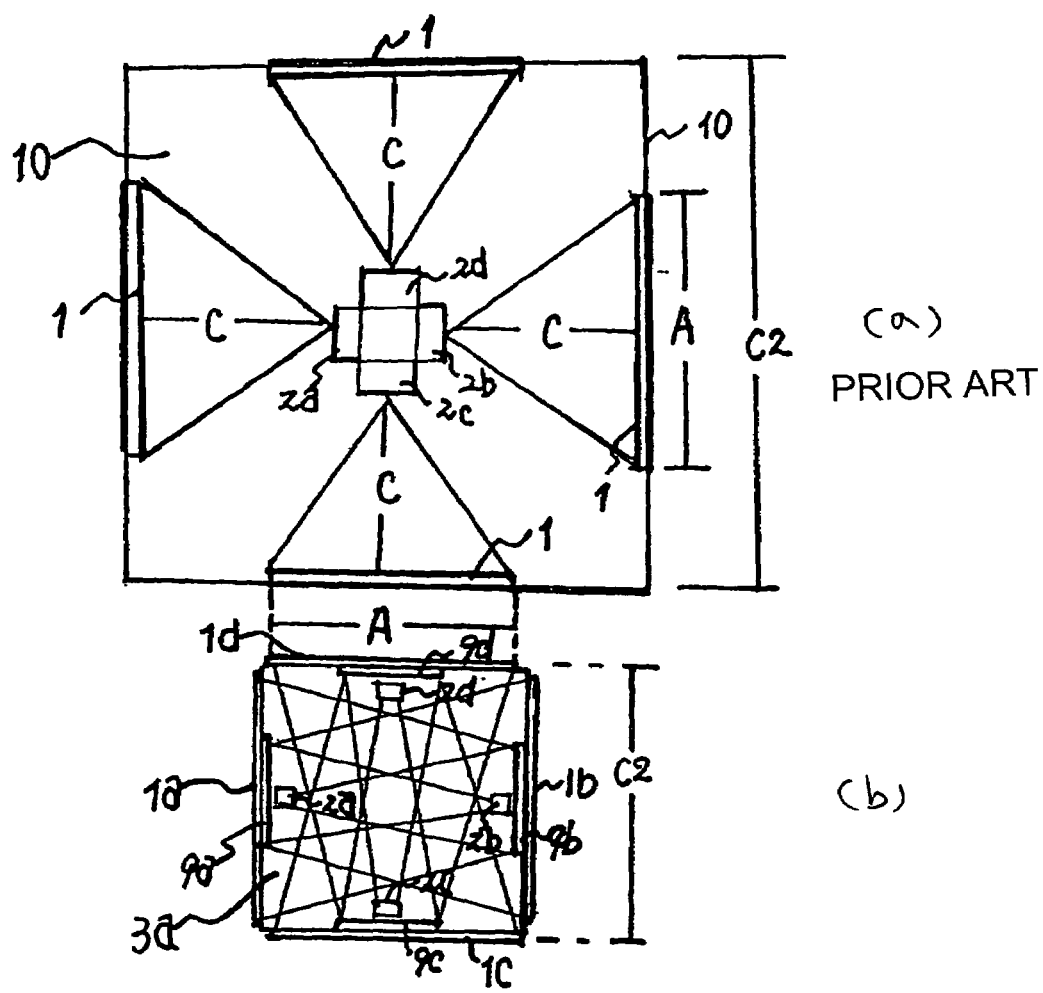
FIG. 15a is a view illustrating the conventional rectangular image case.
FIG. 15b is a view illustrating a rectangular image case of the multi-direction image viewing system according to the preferred embodiment of the present invention.

In the conventional rectangular image case 11 in FIG. 15, when the horizontal length A, i.e. the screen size, is 1.5 m, the projection distance C is 1.95 m due to the projection ratio of 1:1.3.

Thus, since the screens, as shown in FIG. 15a, are installed to the front, rear, left, and right sides of the rectangular image case, the horizontal length C2 of a single side of the conventional rectangular image case 10 becomes twice of the horizontal length A.

In other words, the horizontal length C2 of the rectangular image case is 1.95 m+1.95 m=C×2=3.9 m.

Thus, the cross-sectional area of the conventional rectangular image case 10 is 3.9 m×3.9 m=15.21 m².

FIG. 15b is a view illustrating the structure of the image case of the multi-direction image viewing system according to the preferred embodiments of the present invention.

In order to enlarge the horizontal length C 1.5 m of the screen as the same screen size as that in FIG. 15a, as shown in FIGS. 10a, 10b, and 10c, the projecting light is reflected by the reflecting mirror 9 at the position of half projection distance in the image case to symmetrically cross the left and right projecting light paths so that the projection ratio, i.e. the ratio of the horizontal length A of the screen to the projection distance C can be reduced from 1:1.3 to ¼ of the projection ratio, i.e. 1:0.33.

Thus, since the horizontal length C2 of the rectangular image case 3a can be the same length as the horizontal length A of the screen, i.e. 1.5 m, the cross-sectional area is 1.5 m×1.5 m=2.25 m².

Moreover, although a length of a single side of the image case 3 is 1.5 m, since the symmetric projecting light paths cross each other, the projection distance becomes 3.9 m (2×1.95 m) due to the projection ratio 1:1.3. Since a 3 m screen size, twice of a single side of the image case 3 can be guaranteed, the horizontal length A of the screen can be implemented by 2.3 m by dividing 3 m by the projection ratio 1.3. Even when considering the installation space of the projectors 2, a 1.5 m screen size can be guaranteed.

Thus, a ratio of the cross-sectional area of the image case of the multi-direction image viewing system of the present invention in FIG. 15b to the cross-sectional area of the conventional image case in FIG. 15a is 15.21 m²:2.25 m², cross-sectional area is remarkably reduced to ⅙.₇ (about 15% of the cross-sectional area of the conventional image case), thereby reducing the weight of the image case.

In the image case in FIG. 13, the reflecting mirrors 9 are removed. In this case, since, although reduction of the projection distance C due to the reflecting mirrors 9, the projecting light paths are crossed to each other in the front, rear, left, and right directions, the projection distance C can be 1.95 m, the horizontal length C2 of a single side of the rectangular image case 3a.

Figure 4:
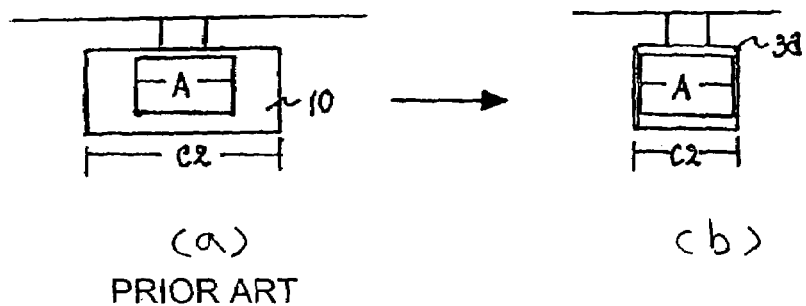
FIG. 4a is a view illustrating the conventional rectangular image case installed on the ceiling.
FIG. 4b is a view illustrating a multi-direction image viewing system according to a preferred embodiment of the present invention installed on the ceiling.
Figure 5:
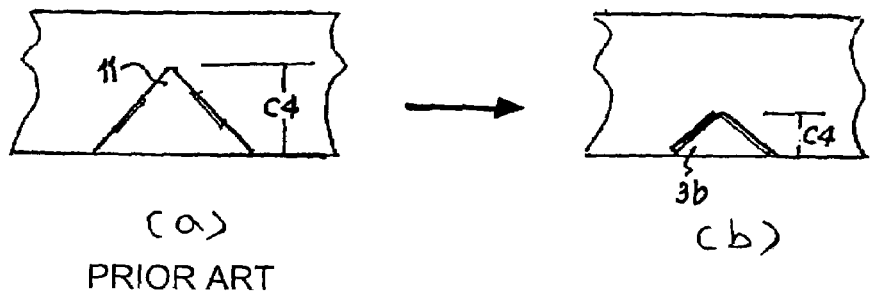
FIG. 5a is a view illustrating the conventional triangular image case installed to a passage.
FIG. 5b is a view illustrating the multi-direction image viewing system according to the preferred embodiment of the present invention installed to a passage.

Thus, the cross-sectional area becomes 1.95 m×1.95 m=3.95 m². Namely, the cross-sectional area is remarkably reduced to 25.6%, i.e. about ¼ of the cross-sectional area of the conventional image case in FIG. 15a, and is remarkably reduced to ⅓ of the cross-sectional area of the conventional image case in FIG. 15a even when considering the installation space of the projectors 2. Therefore, when the image case of the multi-direction image viewing system of the present invention, as shown in FIG. 4b or 5b, is installed in a passage, the image case does not hinder passengers' way because of the short protruded length (namely, the length of a single side of the image case).

Although the length of a single side of the image case in FIG. 15a is 3.9 m, since the length of a single side of the image case in FIG. 15b is 1.6 m and the length of a single side of the image case in FIG. 13 is 1.95 m, the horizontal length C2 of the image case of the multi-direction image viewing system of the present invention in FIG. 15b is about 38% of the horizontal length of the conventional image case in FIG. 15a, and the horizontal length C2 of the image case of the multi-direction image viewing system of the present invention in FIG. 13 is about 50% of the horizontal length of the conventional image case in FIG. 15a. Thus, a factor of disturbing passenger's way can be solved. Therefore, the disturbance factor can also be reduced to, at a minimum, 30%, while, at maximum, to 50% by the multi-direction image viewing system.

Only the triangular image case 3b having the horizontal length A, 1.5 m for the purpose of illustrative convenience.

In order to increase the horizontal length of the screen of the conventional image case 3b in FIG. 1b by 1.5 m, the projection distance C of the projector is 1.95 m due to the projection ratio 1:1.3 as described above.

In the triangular image cases in FIGS. 14a and 11d, since the transparent screens 1 are installed to the left and right sides of the triangular image case, the horizontal length C3 of the triangular image case is 1.95 m×2=3.9 m.

Figure 16:
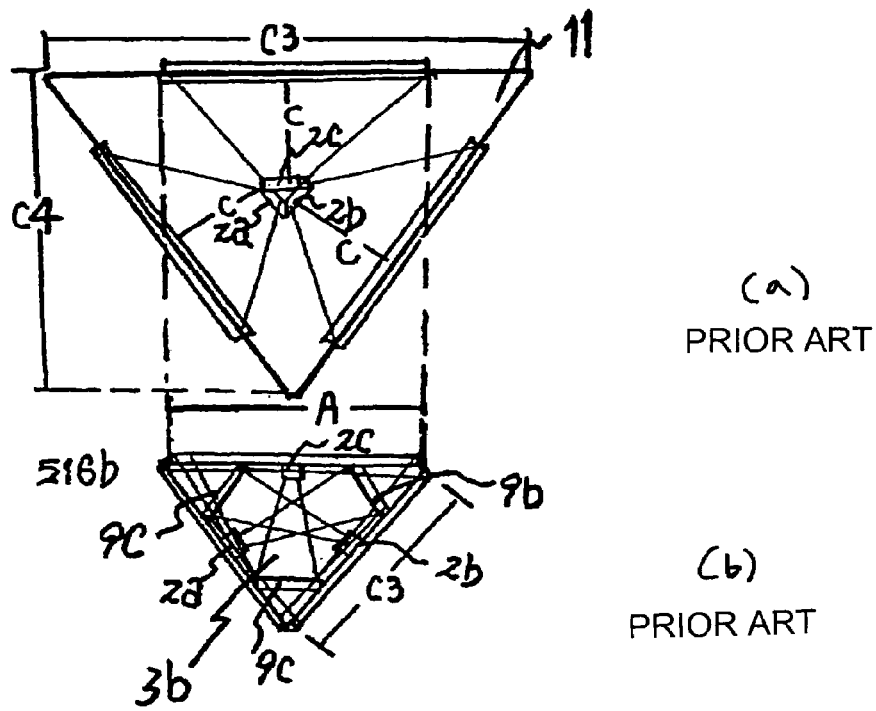
FIG. 16a is a view illustrating the conventional triangular image case.
FIG. 16b is a view illustrating images displayed by a triangular image case of the multi-direction image viewing system according to the preferred embodiment of the present invention.

However, in the image cases in FIGS. 16b and 11c, the cross-sectional area is (side length×height)/2 and the height is the side length×cos 30 (degrees) (0.8666), namely, the height C3 of the triangular image case is 3.38 m, the cross-sectional area of the triangular image case in FIG. 16a is 3.9 m×3.38÷2=6.6 m².

Meanwhile, in the equilateral triangular image case in FIGS. 11d and 16b, since the projecting lights of the left, right, and center projectors 2a, 2b, and 2c are respectively reflected by the left, right, and center reflecting mirrors 9a, 9b, and 9c, and the projecting light paths of the left, right, and center projectors 2a, 2b, and 2c are crossed to each other, the length A of a side of the equilateral triangular image case can be the horizontal length A of the screen, 1.5 m.

Thus, the length of the lower side of the triangular image case in FIGS. 11d and 16b is 1.5 m, the height thereof is 1.5 m×cos 30 (degrees), i.e. CA4=1.299 m (about 1.3 m), and the cross-sectional area thereof is 1.5 m×1.3 m÷2=0.975 m².

As a result, the cross-sectional area of the triangular image case of the multi-direction image viewing system according to the present invention is remarkably reduced to 29.5% (⅓.₄) of the cross-sectional area 6.6 m² of the conventional triangular image case 11 in FIG. 16a.

Moreover, the reflecting mirrors 9 are removed from the image cases in FIGS. 14a and 14b. In this case, since the lengths of the sides of the triangular image case become the projection distance C of the projectors 2, the length of a side of the triangular image case is 1.95 m.

Thus, the length of a side of the image cases in FIGS. 14a and 14b is 1.95 m, the height is 1.69 m, and the cross-sectional area is 1.95 m×1.69 m÷2=1.65 m² that is 25% (¼) of the cross-sectional area 6.6 m² of the image case in FIG. 16a.

Figure 3:
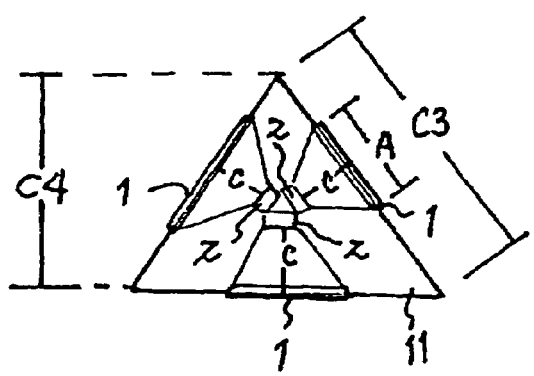
FIG. 3 is a plane view illustrating the structure of a conventional triangular image case.
Figure 14:
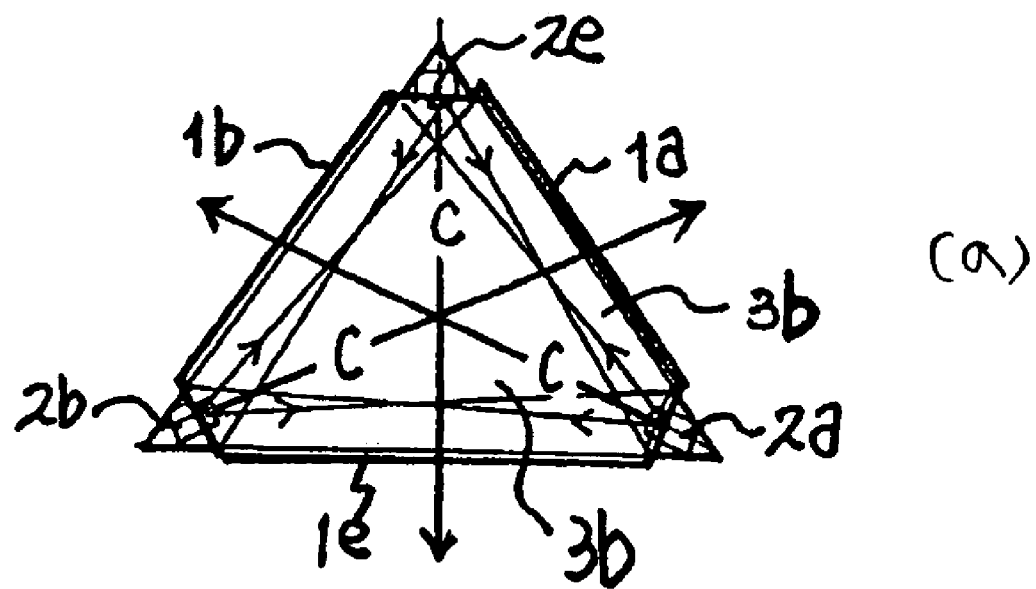
FIG. 14a is a view illustrating bi-directional projecting light paths formed in the triangular image case.
FIG. 14b is a view illustrating twp projectors in a triangular image case.
Figure 14:
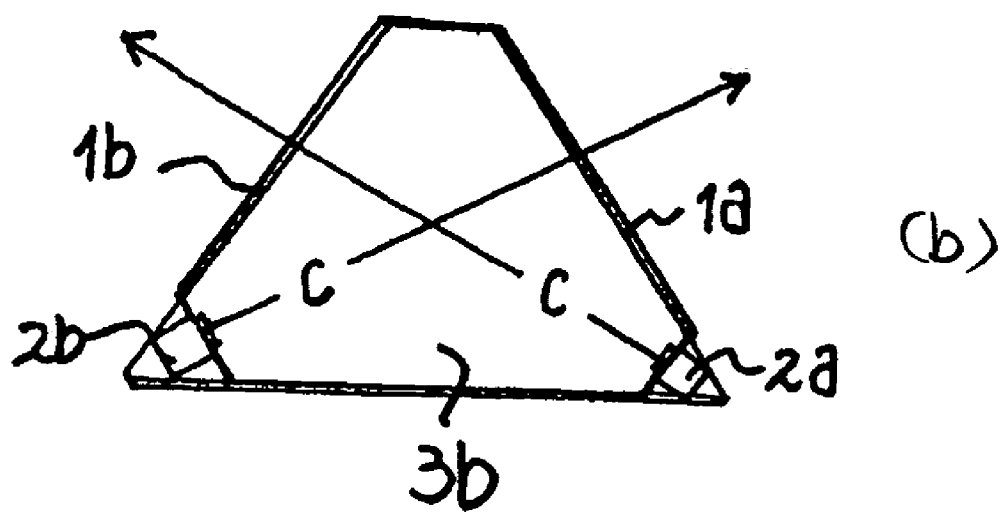

Moreover, as shown in FIG. 5a, when the multi-direction image viewing system according to the present invention is installed in a passage, the height C4 of the image case of the multi-direction image viewing system serves as a factor for obstructing passengers' way. Although the height of the conventional triangular image case 11 in FIGS. 16a and 3a is 3.38 m, the height of the image case of the multi-direction image viewing system in FIG. 16b is 1.3 m, 38% of the height of the conventional triangular image case, and the height of the image case in FIG. 14 is 1.95 m, 57.7% of the height of the conventional triangular image case, thereby reducing the height of the conventional triangular image case.

Thus, according to the present invention, in the rectangular image cases 3a in FIGS. 15a, 15b, and 13, the cross-sectional area of the rectangular image case of the present invention is remarkably reduced to ⅙.₇ to ⅓ of the cross-sectional area of the conventional rectangular image case, thereby reducing the weight also. In the triangular image case 3b in FIG. 11d, the cross-sectional area of the triangular image case of the present invention is reduced to ⅓.₄ to ¼ of the cross-sectional area of the conventional triangular image case in FIG. 16a. The horizontal length C3 of the rectangular image case as the protruding length is remarkably reduced to 50% to 38% of the horizontal length of the conventional rectangular image case, and the horizontal length C4 of the triangular image case as the protruding length is remarkably reduced to 57.7% to 38% of the horizontal length of the conventional triangular image case.

In addition, in the case of the rectangular image case of the multi-direction image viewing system of the present invention in FIG. 10a, since images, as shown in FIGS. 10c and 13, are displayed in multiple directions within the projection distance C of a single projector, the images can be viewed from the front, rear, left, and right, i.e. consumers can view a 360 degree image. In the triangular image case 3a of the present invention in FIGS. 11c and 14b, the transparent screens 1 are installed to the left and right sides of the triangular image case 3a to provide an image having a viewing angle 180 degrees or more, as shown in FIG. 9e. As shown in FIGS. 11d and 14a, if transparent screens 1 are installed to three sides of the triangular image case, an image having a viewing angle of 360 degrees can be provided.

Thus, the multi-direction image viewing system according to the present invention, as shown in FIGS. 5b, 8, and 9d, can be utilized as an image viewing system attachable to a wall due to the reduction of size and weight caused by the area reduction, and can be mounted on the ceiling, as shown in FIG. 4b.

Figure 6:
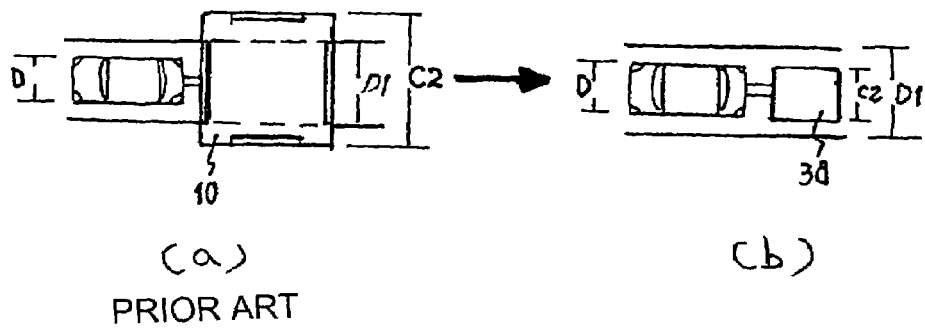
FIG. 6a is a plane view illustrating the conventional rectangular image case engaged with a vehicle and transported by the vehicle.
FIG. 6b is a plane view illustrating the multi-direction image viewing system according to the preferred embodiment of the present invention engaged with a vehicle and transported by the vehicle.
Figure 7:
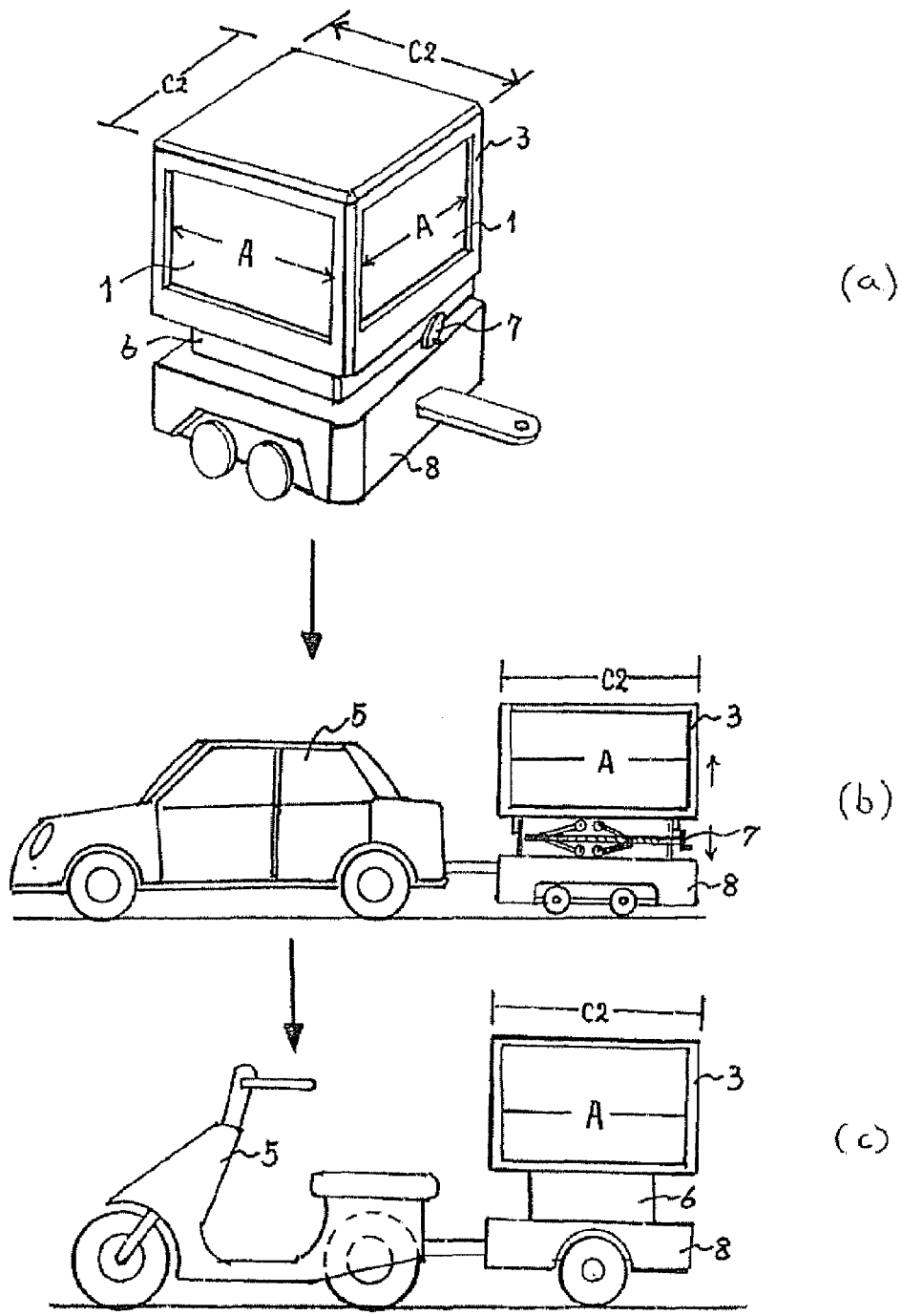
FIG. 7a is a perspective view illustrating the multi-direction image viewing system according to the preferred embodiment of the present invention, engaged with a trailer.
FIG. 7b is a view illustrating the multi-direction image viewing system according to the preferred embodiment of the present invention having a single screen installed to a side thereof and transported by a vehicle.
FIG. 7c is a view illustrating the multi-direction image viewing system according to the preferred embodiment of the present invention transported by a small-sized vehicle.

As shown in FIG. 9d, the multi-direction image viewing system according to the present invention is conveniently coupled with the safety fence 14 of the electric railroad station, and as shown in FIGS. 7, 7a, and 7b, when the multi-direction image viewing system is coupled with the trailer 8, the horizontal lengths C2 and C3 of the triangular and rectangular image cases can be within the horizontal length A of the screen, 1.5 m. Thus, since the horizontal lengths C2 and C3 of the image cases are shorter than the width D, 1.7 m of the vehicle with which the multi-direction image viewing system of the present invention is coupled, as shown in FIG. 6b, the multi-direction image viewing system of the present invention can be transported through lanes D1 of a road with a width 2.5 m to 3.5 m, and, as shown in FIGS. 7b and 7c, can be engaged with a trailer and transported by a small sized vehicle such as a motorcycle due to the minimal size and weight.

As shown in FIG. 17, the triangular image case, including the triangular frame 15 and the flat-screen display 1f such as a plasma display panel, a liquid crystal display, or the like installed to the left and right sides thereof, exhibits the same effect as the effect of the image case of the first preferred embodiment of the present invention. The image cases according to the first and second preferred embodiments of the present invention are suited to a large sized screen of 40 inches, 100 inches, 120 inches, or more, and the image case according to the third preferred embodiment of the present invention is suited to small sized screens of 60 inches or less.

As described above, according to the multi-direction image viewing system of the present invention, plural projectors 2 are symmetrically installed to the inner front, rear, left, and right sides of the image case 3 such as the rectangular image case 3a and the projecting light paths are crossed so that the size of the image case 3 is reduced to $1/6.7$ to $1/3$ of the size of the conventional image case. Even when considering the installation space of the projectors 2 in the image case 3, the size of the image case 3 of the multi-direction image viewing system of the present invention is reduced to $1/2$ of the size of the conventional image case.

Plural projectors 2 are installed to the center, left, and right sides of the image case 3 such as the triangular image case 3b and the projecting light paths are crossed so that the size of the image case of the multi-direction image viewing system of the present invention is reduced to $1/3.4$ of the size of the conventional image case.

The transparent screens and the projectors 2 are symmetrically installed to only the left and right sides of the triangular image case 3b and the projecting light paths of the projectors 2 so that the size of the image case 3 of the multi-direction image viewing system of the present invention is reduced to $1/3$ of the size of the conventional image case.

In addition, the height and the horizontal length as the protruding length of the image case 3 are also reduced to 50% to 38% of those of the conventional image case.

Thus, according to the multi-direction image viewing system of the present invention, the $1/6.7$ to $1/2$ size of the conventional image case 3 can be implemented. The horizontal length A of the screen can be maximized to about 100% of the horizontal length of the image case 3. The protruding length of the image case 3 can be reduced to 50% of the protruding length of the conventional image case. Moreover, screens having a viewing angle of 120 degrees to 360 degrees can be implemented.

Since the weight of the multi-direction image viewing system of the present invention is also reduced due to the size reduction, the multi-direction image viewing system of the present invention may serve as a mobile multi-direction image viewing system coupled with a trailer and transported by a small sized vehicle such as a motorcycle, may serve as a wide viewing angle multi-direction image system attached to a wall and coupled with the safety fence of the bus terminal or the subway station, and may serve as an image viewing system mounted to a ceiling or wall, thereby providing effectiveness and various utility.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-directional image viewing system for displaying an image comprising:
    an image case having a triangular or rectangular shape, the image case having transparent screens respectively formed at inner surfaces of the image case;
    projectors installed below the respective transparent screens;
    reflecting mirrors installed below the respective transparent screens and opposed to the projectors; and
    a trailer coupled to a lower side of the image case, to enable the multi-direction image viewing system to be transported to a desired place.

2. A multi-directional image viewing system for displaying an image comprising:
    a triangular image case having transparent screens respectively formed at side surfaces of the image case, the triangular image case being coupled to a safety fence of a subway station.

3. A multi-directional image viewing system for displaying an image comprising:
    a triangular image case having transparent screens respectively formed at side surfaces of the image case in order to form a 360 degree viewing angle, and reflecting mirrors arranged in front of the transparent screens, respectively, the image case being attached to a display window.

* * * * *